United States Patent
Wajs

(10) Patent No.: US 8,006,249 B2
(45) Date of Patent: Aug. 23, 2011

(54) METHOD OF IMPLEMENTING A STATE TRACKING MECHANISM IN A COMMUNICATIONS SESSION BETWEEN A SERVER AND A CLIENT SYSTEM

(75) Inventor: Andrew Augustine Wajs, Haarlem (NL)

(73) Assignee: Irdeto Access B.V. (NL)

( * ) Notice: Subject to any disclaimer, the term of this patent is extended or adjusted under 35 U.S.C. 154(b) by 1005 days.

(21) Appl. No.: 11/859,239

(22) Filed: Sep. 21, 2007

(65) Prior Publication Data

US 2008/0077938 A1    Mar. 27, 2008

(30) Foreign Application Priority Data

Sep. 21, 2006  (EP) .................................... 06121051

(51) Int. Cl.
  *G06F 9/44* (2006.01)
  *G06F 15/16* (2006.01)
(52) U.S. Cl. ........................ 719/313; 713/150
(58) Field of Classification Search .................. 719/313
  See application file for complete search history.

(56) References Cited

U.S. PATENT DOCUMENTS

| | | | | |
|---|---|---|---|---|
| 5,349,642 A | * | 9/1994 | Kingdon | 713/161 |
| 5,633,931 A | * | 5/1997 | Wright | 713/161 |
| 5,796,952 A | * | 8/1998 | Davis et al. | 709/224 |
| RE37,178 E | * | 5/2001 | Kingdon | 713/170 |
| 2005/0060553 A1 | * | 3/2005 | Allen | 713/182 |
| 2005/0154873 A1 | * | 7/2005 | Cam-Winget et al. | 713/150 |

FOREIGN PATENT DOCUMENTS

| EP | 1648112 | 4/2006 |
|---|---|---|
| GB | 2404126 A | 1/2005 |

OTHER PUBLICATIONS

Google search. Networking support for remote-controlled Visual Tracking System from psu.eduT Ning—1997—Citeseer.*
"European Application No. 06121054 Extended European Search Report", (Feb. 28, 2007),10 pgs.
Mizikovsky, S , et al., "PMK Refresh", grouper.ieee.org/groups/802/16/netman/contrib/C80216-05_040.pdf, (2005),4 pgs.

* cited by examiner

*Primary Examiner* — Lechi Truong
*Assistant Examiner* — Abdou K Seye
(74) *Attorney, Agent, or Firm* — Schwegman, Lundberg & Woessner, P.A.

(57) ABSTRACT

A method of implementing a state tracking mechanism in a communications session between a server and a client system, wherein, in the course of the communications session, application data is provided to the client system in accessible form only if the client system has a valid value of state tracking information, includes transmitting a message carrying a new value of the state tracking information to the client system. It further includes calculating the value of the state tracking information valid after transmission of the message using as input at least the new value carried in the message and a datum maintained at the client system.

19 Claims, 3 Drawing Sheets

METHOD OF IMPLEMENTING A STATE TRACKING MECHANISM IN A COMMUNICATIONS SESSION BETWEEN A SERVER AND A CLIENT SYSTEM

CLAIM OF PRIORITY

The present patent application claims the priority benefit of the filing date of European Application (EPO) No. 06121051.4 filed Sep. 21, 2006, the entire content of which is incorporated herein by reference.

BRIEF DESCRIPTION OF THE DRAWINGS

An example embodiment will be explained in further detail with reference to the accompanying drawings, in which.

BRIEF SUMMARY OF THE INVENTION

Figure 1:
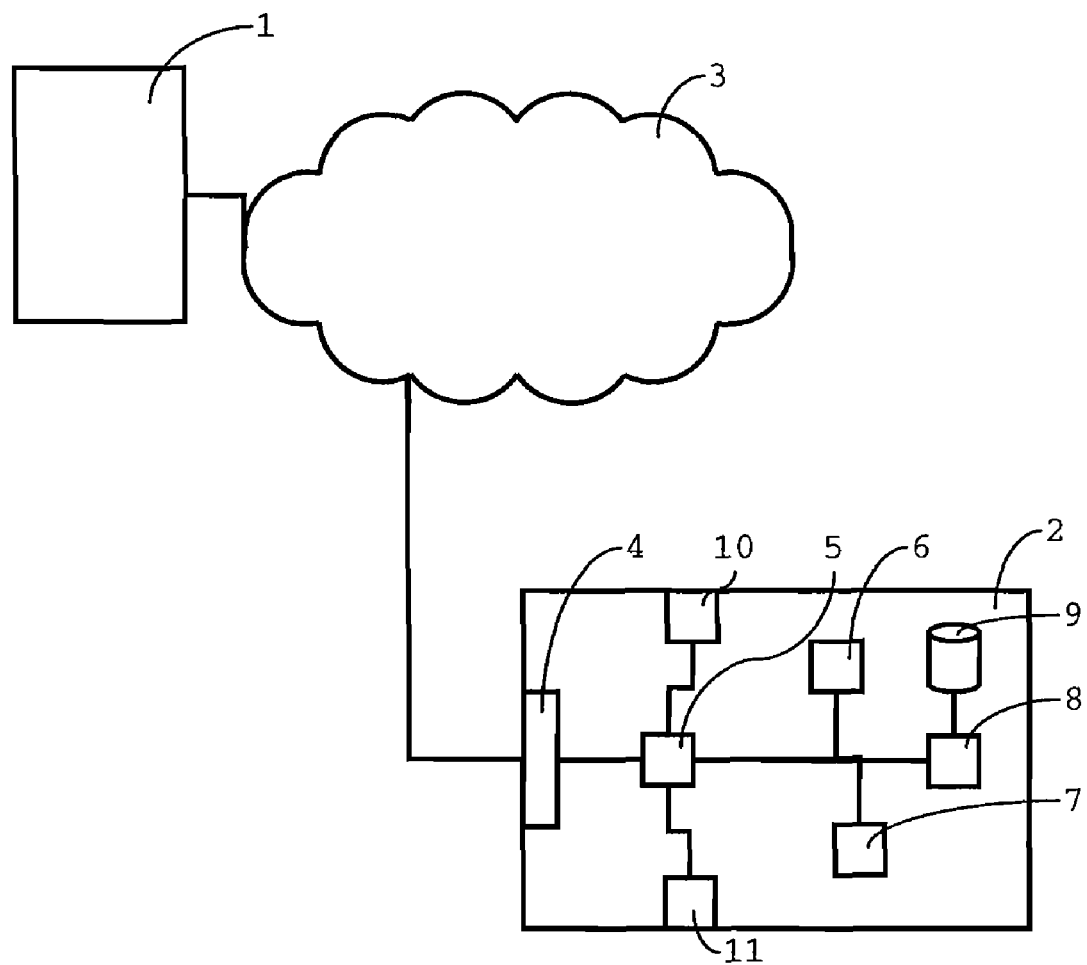
FIG. 1 is a schematic diagram showing a server and a client system for implementing a state tracking mechanism.

Various embodiments of the invention include a method of implementing a state tracking mechanism in a communications session between a server and a client system. The method in various embodiments comprises receiving a first request message from the client system, wherein the first request message includes a first datum and a first state value, retrieving the first datum from the first request message, generating a second datum, calculating a second state value using as input at least the second datum and the first state value, sending a first server response to the client system, wherein the first server response includes the second datum and the second state value, and receiving a second request message from the client system when the client system determines that the second state value is equal to a first client expected state value.

In various embodiments, the second request message includes a third state value, the first client expected state value is calculated using as input at least the second datum retrieved from the first server response and the first state value, and the third state value is calculated using as input at least the first datum and the second state value, including calculating a first server expected state value using as input at least the first datum and the second state value, and determining whether the third state value is equal to the first server expected state value.

In various embodiments, if it is determined that the third state value is not equal to the first server expected state value, discontinuing the communications session. In various embodiments, if it is determined that the third state value is equal to the first server expected state value, calculating a fourth state value using as input at least the second datum and the third state value, sending a second server response to the client system, wherein the second server response includes the fourth state value, and receiving a third request message from the client system when the client system determines that the fourth state value is equal to a second client expected state value, wherein the third request message includes a fifth state value, the second client expected state value is calculated using as input at least the second datum and the fourth state value, and the fifth state value is calculated using as input at least the first datum and the fourth state value.

DETAILED DESCRIPTION

An example embodiment relates to a method of implementing a state tracking mechanism in a communications session between a server and a client system, wherein, in the course of the communications session, application data is provided to the client system in accessible form only if the client system has a valid value of state tracking information, including transmitting a message carrying a new value of the state tracking information to the client system.

An example embodiment also relates to a method of conducting a communications session with a server implementing a state tracking mechanism, including maintaining state tracking information at a client system conducting the communications session, wherein, in the course of the communications session, application data is received from the server and rendered accessible to a target application on the client system only if the state tracking information maintained at the client system corresponds in value to a valid value, and receiving a new value of the state tracking information in a message from the server.

An example embodiment also relates to a server, to a client system and to a computer program.

Examples of such methods are known from Kristol, D. and Montulli, L., "HTTP State Management Mechanism", RFC 2965, The Internet Society, October 2000. That publication describes a way for an origin server to send state information to a user agent, and for the user agent to return the state information to the origin server. It describes three headers, Cookie, Cookie2, and Set-Cookie2, which carry state information between participating origin servers and user agents. The user agent keeps separate track of state information that arrives via Set-Cookie2 response headers from each origin server. The value of the state information ("cookie") may be anything the origin server chooses to send. The content of the Set-Cookie2 response header may be readable by anyone who examines the Set-Cookie2 header. If a user agent receives a Set-Cookie2 response header of which the name is the same as that of a cookie it has previously stored, the new cookie supersedes the old. When it sends a request to an origin server, the user agent includes a Cookie request header if it has stored cookies that are applicable to the request.

The above described technology makes no provision to prevent a client system from being impersonated by an entity intercepting the new values of a cookie that are sent by the server.

An example embodiment provides methods, a server, a client system and a computer program of the types mentioned above with features to help prevent any systems attempting to impersonate a client system from maintaining the same state as the original client system.

A method of implementing a state tracking mechanism according to an example embodiment, includes calculating the value of the state tracking information valid after transmission of the message using as input at least the new value carried in the message and a datum maintained at the client system.

Because, in the course of the communications session, application data is provided to the client system in accessible form only if the client system has a valid value of state tracking information, and the value valid after transmission of the message is calculated using as input a datum maintained in the client system, that datum is required for a client to continue obtaining access to the application data. The application data may e.g. comprise keys for decrypting encrypted content that are distributed by a conditional access system. Because the datum is maintained in the client system, it need not be sent in the message carrying the new value of the state tracking information, so that interception of the message carrying the new value is of no immediate consequence. Because the value of the state tracking information valid after transmission is calculated using as input also the new value carried in the message to the client system, the state of the client evolves as determined by the server. This helps to counter replay attacks.

An example embodiment of the method includes obtaining the datum maintained at the client system in the form of a nonce.

A nonce, or number used once, helps counter unauthorized cloning of the client system. Even if the client system is cloned, e.g. replicated, such that the datum maintained in the client system is also available to the clone, then the clone ceases to function at the end of the session. A new datum, such as a nonce, may be established on commencement of a new communications session between the server and the client system. Alternatively, the datum, such as a nonce, is pre-generated in the client before a communication session is established.

In an embodiment, the nonce is known by the server. The server may receive the nonce from the client system, e.g. on commencement of the communications session. Alternatively, the server may be aware of the nonce of the client before commencement on the communications session. The nonce may e.g. be known by the server by means of a seed from which the nonce can be derived.

The effect is that the nonce need not be communicated from the server to the client system, since it can be generated by the client system. The server is aware of the nonce from the client system, so that both sides are able to calculate valid values of the state tracking information. In particular where the state tracking information is a one-way function, it is not possible to obtain the valid values of the state tracking information by monitoring only the messages from the server to the client system. These messages do not allow one to obtain the datum maintained at the client system.

An embodiment of the method includes calculating at least one of the new value carried in the message and the value of the state tracking information valid after transmission of the message using as input at least the value of the state tracking information valid when carrying out the calculation.

An effect is that the value of the state tracking information valid after transmission of the message carrying a new value of the state tracking information depends on the previously valid value of the state tracking information. This helps to ensure that the communications session continues only between those systems that have participated in the communications session for its entire duration up to transmission of the message.

An embodiment, wherein the client system is provided with a set of identifiers of entitlements to decrypt encrypted information associated with the respective entitlements, includes maintaining a record reflecting the entitlements corresponding to the set of identifiers, and calculating the value of the state tracking information valid after transmission of the message using as a further input data corresponding to at least parts of each of the identifiers in the set provided to the client system.

The set of entitlements need not necessarily be communicated to the client system by the server implementing the state tracking mechanism. Entitlements may be comprised in the application data. It will be recalled that the client system is only provided with application data in accessible form if it has a valid value of the state tracking information. Therefore, in this embodiment, the client system must also calculate the value of the state tracking information valid after transmission of the message using as a further input data corresponding to at least parts of each of the identifiers in the set provided to it. An effect is that the set of identifiers provided to the client system cannot be modified without corresponding amendment of the record maintained at the server.

An embodiment of the method includes calculating the value of the state tracking information valid after transmission of the message using a network address of the client system, e.g., an address hard-wired into equipment used by the client system, on a network via which communications between the server and the client system are effected.

This may help to counter man-in-the-middle attacks, since the value of the state tracking information is tied to the network location of the server. Conventional communication protocols allow for a check of this location.

An embodiment of the method includes calculating the new value carried in the message using as input at least a nonce established and maintained by the server, wherein the nonce is communicated to the client system on commencement of the communication session.

An effect is that the client system can be relatively sure of maintaining a communications session only with the server which originally generated the nonce. This helps to foil attempts to trick the client system into revealing information to another server.

In an embodiment, the application data is provided to the client system upon receipt of a request message from the client system carrying data corresponding to the valid value of the state tracking information.

Thus, multiple transmissions of application data can be carried out after one check that the client system still has the valid value of the state tracking information.

In an embodiment, the application data is provided in encrypted form, encrypted so as to permit decryption under a key derivable using at least part of the valid value of the state tracking information.

An effect is to provide a continual, stronger check of the value of the state tracking information maintained by the client. Variants in which the client system does not transmit messages containing the value of the state tracking information as maintained by it also become possible. The check of the validity of the value of the state tracking information as maintained by the client is in effect carried out at the client system, when an attempt is made to decrypt the application data. A further effect is that access to the application data can be restricted to an interval throughout which the client system is in a certain state.

In an embodiment, the client system is provided with a set of content data, encrypted to permit decryption under a key, wherein the application data includes values of the key.

An effect is that the check on the validity of the value of the state tracking information that the client has, need not be carried out with every transmission of content data, but only to provide the key in accessible form. This is relatively efficient, yet limits access to the content data to client systems in a certain state.

A server system according to an example embodiment includes a data processing unit and memory, and is arranged to carry out a method of implementing a state tracking mechanism according to an example embodiment.

A method of conducting a communications session with a server implementing a state tracking mechanism according to an example embodiment may include calculating a further value of the state tracking information using as input at least the new value in the message and a datum stored at the client system, and replacing the state tracking information maintained at the client system by the further value.

An effect is that, on receipt of the new value of the state tracking information in a message from the server, the valid value of the state tracking information can only be obtained at the client system that also stores the datum. The datum is not included in the message, so that the next valid value cannot be obtained by monitoring the messages from the server.

An embodiment of the method includes obtaining the datum stored at the client system in the form of a nonce on commencement of the communications session.

An effect is that, if the client system is cloned with the datum, the clone will only remain functional until the end of the current communications session.

An embodiment includes generating the nonce at the client system, for example by generating a random number and communicating the nonce to the server on commencement of the communications session.

Thus, valid values of the state tracking information cannot be obtained by monitoring only the subsequent communications between the server and the client system, or all messages from the server to the client system.

In an embodiment, wherein the client system maintains a set of identifiers of entitlements to decrypt encrypted information associated with the respective entitlements, the method includes calculating the further value of the state tracking information using as a further input data corresponding to at least parts of each of the identifiers in the set.

An effect is that the set of identifiers cannot be modified without leading to invalid values of the state tracking information. Since the value of the state tracking information evolves, this remains the case throughout the communications session.

In an embodiment, wherein communications between the server and the client system are effected via a network, and wherein the client system has an address on the network, for example a hard-wired into equipment used by the client system, the method includes calculating the further value of the state tracking information using as a further input data corresponding to at least part of the network address.

Thus, the state of the client system is tied to the network address used to communicate with the server.

An embodiment of the method includes receiving a message carrying a nonce established by the server on commencement of the communications session, and calculating an expected value of the new value of the state tracking information received in the message from the server using at least the nonce established by the server as input, wherein the further value of the state tracking information is only calculated upon determining that the expected value matches the value received in the message from the server.

An effect is that a check is carried out to ascertain that the communications session remains with the same server.

An embodiment of the method includes calculating an expected value of the new value of the state tracking information received in the message from the server using as input at least the value of the state tracking information maintained at the client system at receipt of the message, wherein the further value of the state tracking information is only calculated upon determining that the expected value matches the value received in the message from the server.

An effect is that the client system is able to check that the message ostensibly received from the server is from the same server as the one keeping track of the evolution of the state of the client system.

An embodiment of the method includes requesting transmission of the application data by sending a message including data corresponding to at least part of the state tracking information maintained at the client system.

An effect is that the client system proves to the server that it is in the correct state to receive the application data. Only then is the application data transmitted, which helps prevent unnecessary transmissions to unauthorized client systems.

An embodiment of the method includes receiving the application data in encrypted form, and using the state tracking information maintained at the client system to derive a key for decrypting the encrypted application data.

An effect is that the check on the state of the client system is carried out at the client system every time the latter tries to obtain the application data in accessible form.\

An embodiment includes receiving a stream of encrypted content data, and obtaining a key to decrypt the encrypted content data from the application data received from the server.

The embodiment represents an implementation of a state tracking mechanism in a conditional access system or digital rights management system.

A client system according to an example embodiment includes a data processing unit and memory and is arranged to carry out a method of conducting a communications session with a server according to an example embodiment.

According to an example embodiment, there is provided a computer program, including a set of instructions capable, when incorporated in a machine readable medium, of causing a system having information processing capabilities to perform a method according an example embodiment.

An example embodiment A server system 1 implements a state tracking mechanism in a communications session with a client system 2. Data is exchanged through a network 3, typically a Wide-Area Network (WAN). The network 3 may comprise a number of different types of networks, e.g. optical, wireless, satellite or public switched telephone networks. The state tracking mechanism can be implemented in a configuration in which communication is one-way, from the server system 1 to the client system 2. In the most elaborate embodiment described herein, data is transmitted in both directions.

In the example, the client system 2 is provided with a network interface 4, an interface 5 to a bus that interconnects a central processing unit 6, main memory 7 and an interface 8 to a storage medium 9. The interface 5 further provides connections to a video processor 10 and an audio processor 11. The client system 2 may be representative of a personal computer, games console, set-top box, or similar device. It may be provided with an interface (not shown) to an access token, such as a smart card. Alternatively, a secure piece of software installed or temporarily stored in the client system 2 may function as an access token. Such a secure piece of software may be provided in the form of obfuscated computer program code, which is difficult to reverse engineer.

The client system 2 is further provided with a client software module that enables it to conduct the communications session with the server system 1. The client software module co-operates with software running on the server system 1 to enable the latter to implement a form of state tracking. The client system 2 sets up such a communications session in order to obtain application data for a content data decoding application running on the client system. The application data includes identifiers of entitlements to decrypt and decode certain streams of audio and/or video data, which the client system 2 may receive from the server system 1, from another server attached to the network 2, or from a portable storage medium. Such identifiers of entitlements are stored in the device or software module that functions as access token. The application data additionally includes encrypted keys for decrypting the content data. It is noted that the client system may also include an application to implement a Digital Rights Management (DRM) system for obtaining access to an encrypted set of content data. The application data targeted at such an application will include encrypted digital rights objects, each identifying a set of content data that the client system is entitled to access.

The client system 2 is only provided with the application data in accessible form if it has a valid value of state tracking information, in this example a state variable SV. To prevent easy cloning of the client system, the state variable SV may be stored in a secure component of the client system 2, for example the access token. The client system 2 may be provided with the application data in encrypted form regardless of whether the client system has the currently valid state variable SV, with the application data only being decryptable if the valid state variable SV is present. Additionally or alternatively, the application data may only be transferred from the server system 1 to the client system 2 if the client system 2 has proved that it has the currently valid state variable.

The state variable SV is changed at regular intervals at the behest of the server system 1. To this end, it sends a message to the client system 2 carrying a new value of the state variable SV. After a change in the value of the state variable, any copy of the client system 2 will cease to be provided with application data in accessible form. Even if such a copy were also to receive the message carrying the new value of the state variable, it would also have to have the value of a datum maintained at the client system 2. This is because the value of the state variable valid after transmission of the message carrying the new value of the state variable SV is calculated by the client system 2, using as input at least the new value carried in the message and the datum maintained at the client system 2.

The datum maintained at the client system 2 is established anew at the start of each communications session. It is valid only for one communications session, and has a value unique to the communications session concerned. It may be obtained from a one-time pad. For added protection against cloning of the client system 2, the client system may generate the datum, for example as a random number.

Figure 2A:
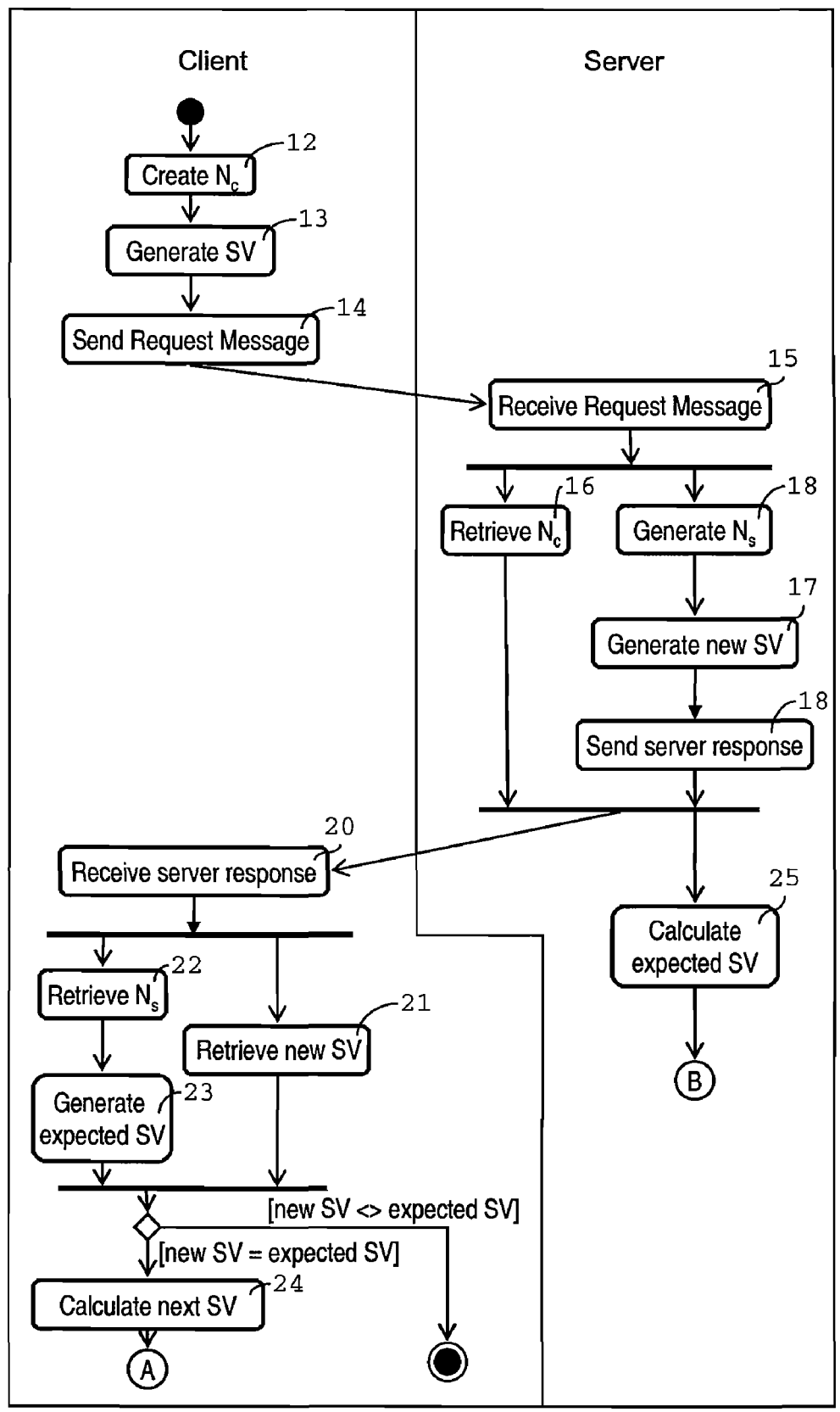
FIGS. 2A-2B form an activity diagram illustrating actions and object flow in an embodiment of a state tracking mechanism.
Figure 2B:
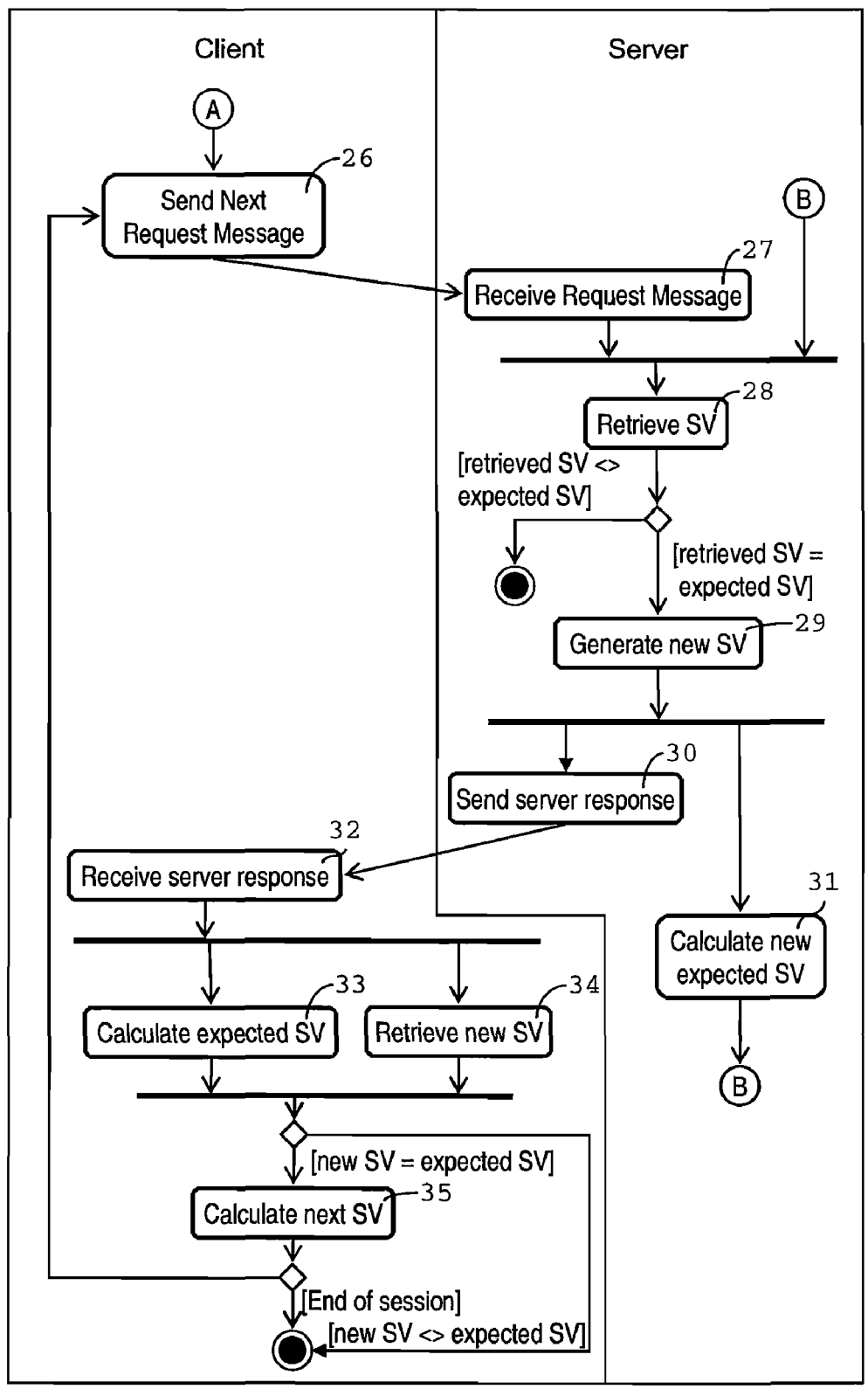

FIGS. 2A-2B illustrate the state tracking mechanism in more detail. The diagram does not illustrate that, whilst the illustrated operations are carried out, the client system 2 is continually provided with application data in accessible form only if the client system has a valid value of state tracking information.

The client system 2 generates a client nonce $N_c$, the datum referred to above, in a first step 12. It then (step 13) generates a first value of the state variable SV. The first value of the state variable SV may be any value chosen by the client system 2. It may also be a function of a value chosen at random by the client system 2 and one or more other variables, including in particular the client nonce $N_c$.

The client system 2 sends (step 14) a request message to the server system 1 to establish a new communications session. The request message includes the client nonce $N_c$ and the first value of the state variable SV.

The server system 1 receives the request message (step 15). The client nonce $N_c$ is received by the server system 1 from the client system 2 on commencement of the communications session, since it is included in the request message and retrieved from this message by the server system 1 (step 16). The request message may additionally comprise data enabling the server system to carry out an initial verification of the client's entitlement to receive the requested application data.

After receipt of the request message, the server system 1 calculates a new state variable value (step 17) using as input at least a server nonce $N_s$ established (step 18) and maintained by the server system 1. The server nonce $N_s$ is retained in memory at the server system 1 for the duration of the communications session, but not used subsequently. The server nonce $N_s$ may be based on a random number. The server nonce $N_s$ is communicated to the client system 2 on commencement of the communication session, namely in a response message sent (step 19) in reply to the client system's request message. The new state variable value carried in the response message is calculated using as a further input at least the value of the state tracking information valid when carrying out the calculation, e.g. the value received in the request message. This chains the state variable values, in the sense that the currently valid value is always dependent on all the previous values, as well as on the server nonce $N_s$ and client nonce $N_c$.

As stated above, the client system 2 has available a set of identifiers of entitlements to decrypt encrypted information associated with the respective entitlements. The server system 1 maintains a record reflecting the entitlements corresponding to the set of identifiers stored by the client system 2. When calculating the new state variable value to be included in the response message, the server system 1 uses as a further input data corresponding to at least parts of each of the identifiers in the set provided to the client system 2.

The server system 1 may also use a network address of the client system 2, for example an address hard-wired into the network interface 4, such as a MAC-address, as input to the algorithm used to calculate a new state variable value. The address value may alternatively be an Internet Protocol (IP) address.

The algorithm used to calculate a new state variable value may be a strong or weak one-way function, also known as trapdoor function. An effect is that the server nonce $N_s$ and client nonce $N_c$ are hard to compute from only state variable values exchanged between the server system 1 and the client system 2. The algorithm may comprise a hash function.

The client system 2 receives (step 20) the new value of the state variable SV in the response message from the server system 1. The new value of the state variable SV is retrieved from the response message (step 21). It does not, however, directly replace the value of the state variable previously maintained as the valid value in the client system 2.

The response message received by the client system 2 also carries the server nonce $N_s$, established by the server on commencement of the communications session. The client system 2 retrieves the server nonce $N_s$ from the response message (step 22). It calculates (step 23) an expected value of the new value of the state variable received in the response message from the server system 1 using at least the server nonce $N_s$ as input, but also the state variable value generated in step 13 and maintained at the client system 2, as well as the set of entitlement identifiers and the network address of the client system 2.

If the calculated expected value matches the state variable value received in the response message from the server system 1, then the client system 2 proceeds to calculate (step 24) a further value of the state tracking information using as input the new value in the response message and a datum stored at the client system, namely the client nonce $N_s$, as well as the set of entitlement identifiers and the network address of the client system 2. The further value replaces the state variable value maintained at the client system 2, and is used to establish that the client system 2 is entitled to receive application data in accessible form.

The server system 1 also calculates (step 25) the value of the state tracking information valid after transmission of the response message using as input at least the new value carried in the message and the client nonce $N_c$. This allows it to check the state of the client system 2 when providing the latter with application data in accessible form.

In the course of the communications session, the client system 2 may send further request messages (step 26). These include data corresponding to at least part of the value of the state variable SV maintained at the client system 2. In response to each or only some of the request messages, the server system 1 will carry out the steps indicated in FIG. 2B.

Upon receiving the request message (step 27), the server system 1 retrieves the state variable value carried in the request message (step 28). If the retrieved value matches the expected value calculated in step 25, the server system 1 generates a new state variable value (step 29).

The new state variable value may be calculated as before, using as input the state variable value valid up to now, the server nonce $N_s$, the set of entitlement identifiers, and the network address of the client system 2. The new state variable value is sent (step 30) in a further response message to the client system 2. Again, the next valid value of the state variable is calculated (step 31) using as input the new state variable value sent in step 30 and the client nonce $N_c$, as well as data based on a record reflecting the entitlements to decrypt encrypted information corresponding to the set of identifiers provided to the client system 2.

The server system 1 may be arranged to provide application data only if subsequent requests for application data includes the value of the state variable SV calculated as the next valid value. Additionally or alternatively, the server system 1 may provide a system for encrypting the application data with a key based on the next valid value of the state variable, so that only the client system with the next valid value can decrypt the application data.

The client system 2 receives the further response message (step 32). It calculates an expected value of the new value of the state tracking information received in the further response message from the server system 1 using at least the server nonce $N_s$ and the previously valid state variable value as input (step 33). It also retrieves the new value of the state variable SV actually received in the further response message from the server system 1 (step 34). Upon determining that the expected value matches the value received in the message from the server system 1, the further value of the state tracking information is calculated (step 35). This is the value of the state variable that is valid after transmission of the further response message to the client system 2.

Because the further value is based on the client nonce $N_s$ as well as the value carried in the further response message, copying the value carried in the further response message is not sufficient to put an illicit clone of the client system 2 in the same state as the original client system 2.

The invention is not limited to the embodiments described above, which may be varied within the scope of the accompanying claims. For instance, the new value of the state variable calculated by the server system 1 and transmitted to the client system 1 in a response message need not necessarily be based on the inputs used by the client system 2 to calculate the next valid value of the state variable. The request messages and/or the response messages may be encrypted, for example under a key derived from the value of the state variable valid before receipt of the message concerned.

What is claimed is:

1. A method of implementing a state tracking mechanism in a communications session between a server and a client system, comprising:
   receiving a first request message from the client system, wherein the first request message includes a first datum and a first state value;
   retrieving the first datum from the first request message;
   generating a second datum;
   calculating a second state value using as input at least the second datum and the first state value;
   sending a first server response to the client system, wherein the first server response includes the second datum and the second state value;
   receiving a second request message from the client system when the client system determines that the second state value is equal to a first client expected state value, wherein: the second request message includes a third state value,
   the first client expected state value is calculated using as input at least the second datum retrieved from the first server response and the first state value, and
   the third state value is calculated using as input at least the first datum and the second state value;
   calculating a first server expected state value using as input at least the first datum and the second state value;
   determining whether the third state value is equal to the first server expected state value;
   if determined that the third state value is not equal to the first server expected state value, discontinuing the communication session;
   if determined that the third state value is equal to the first server expected state value,
     calculating a fourth state value using as input at least the second datum and the third state value,
     sending a second server response to the client system, wherein the second server response includes the fourth state value, and
     receiving a third request message from the client system when the client system determines that the fourth state value is equal to a second client expected state value, wherein:
       the third request message includes a fifth state value,
       the second client expected state value is calculated using as input at least the second datum and the fourth state value, and
       the fifth state value is calculated using as input at least the first datum and the fourth state value.

2. The method according to claim 1, wherein the first datum comprises a nonce.

3. The method according to claim 1, wherein the client system is provided with a set of identifiers of entitlements to decrypt encrypted information associated with the respective entitlements and the method further comprises:
   maintaining a record reflecting the entitlements corresponding to the set of identifiers, and
   calculating the first server expected state value using as a further input data corresponding to at least parts of each of the identifiers in the set provided to the client system.

4. The method according to claim 1, further comprising:
   calculating the first server expected state value using a network address of the client system, hard-wired into equipment used by the client system, on a network via which communications between the server and the client system are effected.

5. The method according to claim 1, further comprising: providing application data to the client system if determined that the third state value is equal to the first server expected state value.

6. The method according to claim 5, wherein the application data is provided in encrypted form, encrypted so as to permit decryption under a key derivable using at least part of the second state value when the client system determines that the second state value is equal to the first client expected state value, the fourth state value when the client system determines that the fourth state value is equal to the second client expected state value, or the third state value when determined that the third state value is equal to the first server expected state value.

7. The method according to claim 5, wherein the client system is provided with a set of content data, encrypted to permit decryption under a key, wherein the application data includes values of the key.

8. The method according to claim 1, wherein the steps of receiving the second request message, calculating the first server expected state value, determining whether the third state value is equal to the first state value, and, when determined that the third state value is equal to the first state value, calculating the fourth state value and sending the second server response to the client system comprise determining that the client system has a valid value of state tracking information, the method further comprising:
repeating the step of determining whether the client system has the valid value of the state tracking information throughout the duration of the communications session, and
providing application data to the client system only as long as it is determined that the client system has the valid value of the state tracking information.

9. A server system, including a data processing unit and memory, arranged to carry out a method of implementing a state tracking mechanism in a communication session between the server and a client system, the method including:
receiving a first request message from the client system, wherein the first request message includes a first datum and a first state value;
retrieving the first datum from the first request message;
generating a second datum;
calculating a second state value using as input at least the second datum and the first state value;
sending a first server response to the client system, wherein the first server response includes the second datum and the second state value;
receiving a second request message from the client system when the client system
determines that the second state value is equal to a first client expected state value, wherein:
the second request message includes a third state value,
the first client expected state value is calculated using as input at least the second datum retrieved from the first server response and the first state value, and
the third state value is calculated using as input at least the first datum and the second state value;
calculating a first server expected state value using as input at least the first datum and the second state value;
determining whether the third state value is equal to the first server expected state value;
if determined that the third state value is not equal to the first server expected state value, discontinuing the communications session;
if determined that the third state value is equal to the first server expected state value,
calculating a fourth state value using as input at least the second datum and the third state value,
sending a second server response to the client system, wherein the second server response includes the fourth state value, and
receiving a third request message from the client system when the client system determines that the fourth state value is equal to a second client expected state value, wherein:
the third request message includes a fifth state value,
the second client expected state value is calculated using as input at least the second datum and the fourth state value, and
the fifth state value is calculated using as input at least the first datum and the fourth state value.

10. A method of conducting a communications session with a server implementing a state tracking mechanism, comprising:
generating a first datum;
generating a first state value;
sending a first request message to the server, wherein the first request message includes the first datum and the first state value;
receiving a first server response from the server, wherein the first server response includes a second datum and a second state value, wherein the second state value is calculated using as input at least the second datum and the first state value;
retrieving the second datum from the first server response;
calculating a first client expected state value using as input at least the second datum retrieved from the first server response and the first state value;
determining whether the second state value is equal to the first client expected state value;
if determined that the second state value is not equal to the first client expected state value, discontinuing the communication session; and
if determined that the second state value is equal to the first client expected state value,
calculating a third state value using as input at least the first datum and the second state value,
sending a second request message to the server, wherein the second request message includes the third state value,
receiving a second server response from the server when the server determines that the third state value is equal to a first server expected state value, wherein:
the second server response includes a fourth state value;
the first server expected state value is calculated using as input at least the first datum and the second state value; and
the fourth state value is calculated using as input at least the second datum and the third state value,
calculating a second client expected state value using as input at least the second datum and the fourth state value,
determining whether the fourth state value is equal to the second client expected state value,
if determined that the fourth state value is not equal to the second client expected state value, discontinuing the communications session,
if determined that the fourth state value is equal to the second client expected state value, calculating a fifth state value using as input at least the first datum and the fourth state value; and sending a third request message to the server, wherein the third request message includes the fifth state value.

11. The method according to claim 10, wherein the first datum comprises a nonce generated on commencement of the communications session.

12. The method according to claim 10, further comprising:
maintaining a set of identifiers of entitlements to decrypt encrypted information associated with the respective entitlements and calculating the third state value using as a further input data corresponding to at least parts of each of the identifiers in the set.

13. The method according to claim 10, wherein communications between the server and a client system are effected via a network, and wherein the client system has an address on the network, hard-wired into equipment used by the client system, wherein the method further comprises:
calculating the third state value using as a further input data corresponding to at least part of the network address.

14. The method according to claim 10, including requesting transmission of the application data by sending a message to the server, including data corresponding to at least part of the first state value, the third state value or the fifth state value.

15. The method according to claim 10, further comprising:
receiving application data in encrypted form, and
using at least one of the first state value, the third state value, and the fifth state value to derive a key for decrypting the encrypted application data.

16. The method according to claim 10, further comprising:
receiving a stream of encrypted content data, and
obtaining a key to decrypt the encrypted content data from the application data received from the server.

17. The method according to claim 10, wherein the steps of receiving a second server response, calculating a second client expected state value, determining whether the fourth state value is equal to the second client expected state value, and, when determined that the fourth state value is equal to the second client expected state value, calculating a fifth state value and sending a third request message to the server comprise determining that a client system has a valid value of state tracking information, the method further comprising:
repeating the step of determining whether the client system has the valid value of the state tracking information throughout the duration of the communications session, and
receiving application data from the server only as long as it is determined that the client system has the valid value of the state tracking information.

18. A client system, including a data processing unit and memory, arranged to carry out a method of conducting a communication session with a server implementing a state tracking mechanism, the method including:
generating a first datum;
generating a first state value;
sending a first request message to the server, wherein the first request message includes the first datum and the first state value;
receiving a first server response from the server, wherein the first server response includes a second datum and a second state value, wherein the second state value is calculated using as input at least the second datum and the first state value;
retrieving the second datum from the first server response;
calculating a first client expected state value using as input at least the second datum retrieved from the first server response and the first state value;
determining whether the second state value is equal to the first client expected state value;
if determined that the second state value is not equal to the first client expected state value, discontinuing the communication session; and
if determined that the second state value is equal to the first client expected state value,
calculating a third state value using as input at least the first datum and the second state value,
sending a second request message to the server, wherein the second request message includes the third state value,
receiving a second server response from the server when the server determines that the third state value is equal to a first server expected state value, wherein:
the second server response includes a fourth state value;
the first server expected state value is calculated using as input at least the first datum and the second state value: and
the fourth state value is calculated using as input at least the second datum and the third state value,
calculating a second client expected state value using as input at least the second datum and the fourth state value,
determining whether the fourth state value is equal to the second client expected state value,
if determined that the fourth state value is not equal to the second client expected state value, discontinuing the communications session,
if determined that the fourth state value is equal to the second client expected state value,
calculating a fifth state value using as input at least the first datum and the fourth state value; and
sending a third request message to the server, wherein the third request message includes the fifth state value.

19. A computer program, including a set of instructions stored on a non-transitory computer readable medium, that when executed by a processor cause a system to perform a method of implementing a state tracking mechanism in a communication session between, the method including:
receiving a first request message from a client system, wherein the first request message includes a first datum and a first state value;
retrieving the first datum from the first request message;
generating a second datum;
calculating a second state value using as input at least the second datum and the first state value;
sending a first server response to the client system, wherein the first server response includes the second datum and the second state value;
receiving a second request message from the client system when the client system determines that the second state value is equal to a first client expected state value, wherein:
the second request message includes a third state value,
the first client expected state value is calculated using as input at least the second datum retrieved from the first server response and the first state value, and
the third state value is calculated using as input at least the first datum and the second state value,
calculating a first server expected state value using as input at least the first datum and the second state value;
determining whether the third state value is equal to the first server expected state value;

if determined that the third state value is not equal to the first server expected state value, discontinuing the communications session;

if determined that the third state value is equal to the first server expected state value, calculating a fourth state value using as input at least the second datum and the third state value, sending a second server response to the client system, wherein the second server response includes the fourth state value, and receiving a third request message from the client system when the client system determines that the fourth state value is equal to a second client expected state value, wherein:

the third request message includes a fifth state value, the second client expected state value is calculated using as input at least the second datum and the fourth state value, and the fifth state value is calculated using as input at least the first datum and the fourth state value.

\* \* \* \* \*